W. ROSS.
GRAIN METER.
APPLICATION FILED JULY 22, 1908.
920,656.                                    Patented May 4, 1909.
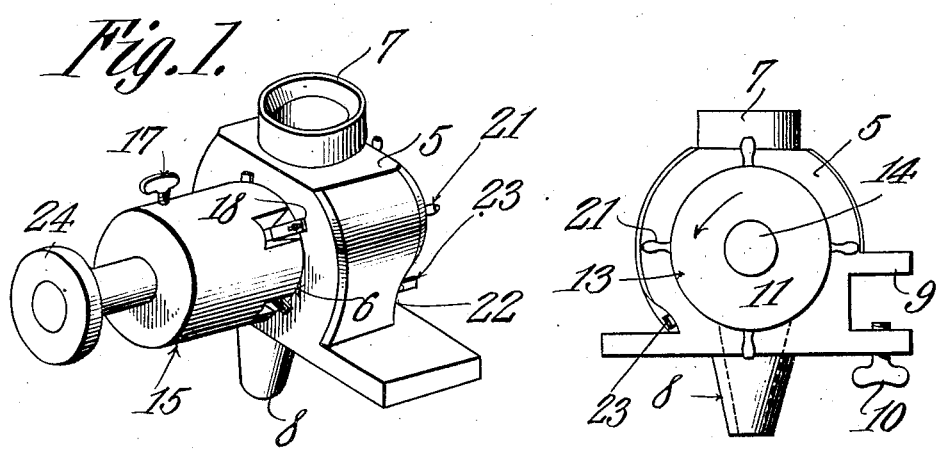
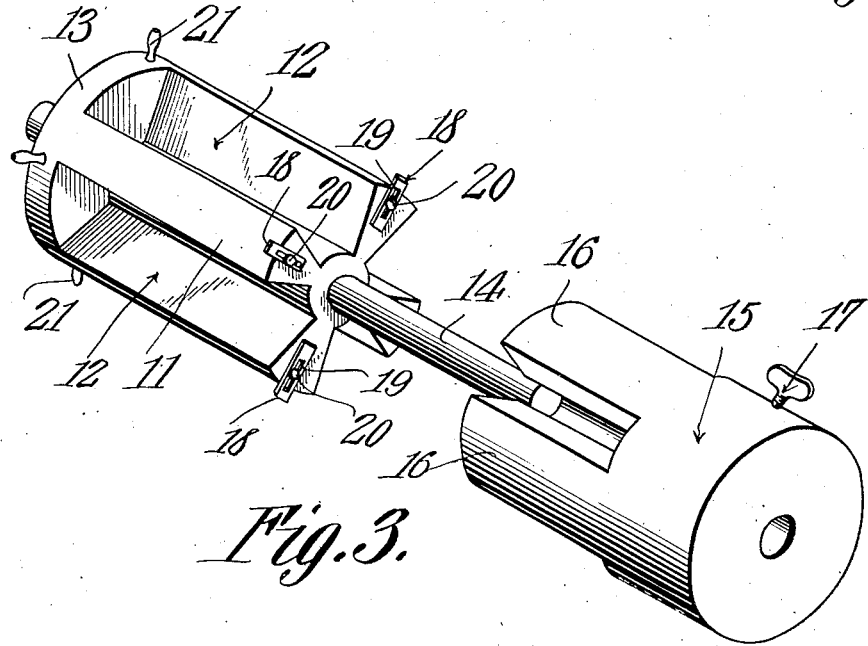
Witnesses
Inventor
William Ross.
By C. A. Snow & Co.
Attorneys

UNITED STATES PATENT OFFICE.

WILLIAM ROSS, OF LOUISVILLE, KENTUCKY.

GRAIN-METER.

No. 920,656.  Specification of Letters Patent.  Patented May 4, 1909.

Application filed July 22, 1908. Serial No. 444,807.

*To all whom it may concern:*

Be it known that I, WILLIAM ROSS, a citizen of the United States, residing at Louisville, in the county of Jefferson and State of Kentucky, have invented a new and useful Grain-Meter, of which the following is a specification.

This invention relates to grain meters and has for its object to provide a comparatively simple and thoroughly efficient machine of this character especially designed for measuring seed, grain and other material and discharging the same into suitable bags or receptacles.
A further object of the invention is to provide means whereby the capacity of the several measuring compartments or pockets may be regulated to permit the discharge of any desired quantity of material into the packages.

A further object is to provide a grain meter including a rotary cylinder having pockets or compartments formed therein for the reception of the material, there being a gage or follower slidably mounted on the operating shaft of the machine and provided with fingers adapted to enter the several compartments for simultaneously varying the capacity of all of said pockets and rendering the same of uniform size.

Further objects and advantages will appear in the following description, it being understood that various changes in form, proportions and minor details of construction may be resorted to within the scope of the appended claims.

In the accompanying drawings forming a part of this specification: Figure 1 is a perspective view of a combined measuring and filling device constructed in accordance with my invention. Fig. 2 is a rear elevation of the same. Fig. 3 is a perspective view of the rotary cylinder and gage detached.

Similar numerals of reference indicate corresponding parts in all of the figures of the drawings.

The improved machine forming the subject matter of the present invention includes a casing 5 having a cylindrical bore 6, and provided with a hopper 7 and discharge spout 8 communicating with the bore, as shown.

Extending laterally from one side of the casing 5 are spaced ears or lugs 9 adapted to embrace a table top or other suitable support, the lower lug being provided with a vertical perforation for the reception of a screw or similar fastening device 10, by means of which the casing may be held in position on
the support.

Mounted for rotation within the bore 6 is a cylinder 11 having a plurality of radiating pockets or compartments 12 formed therein, for the reception of the grain, seed or other material to be measured, said pockets terminating short on one end of the cylinder to form a flange 13.

Extending longitudinally of the cylinder 11 and keyed or otherwise rigidly secured thereto is an operating shaft 14 on which is slidably mounted a gage 15.

The gage 15 is provided with a plurality of longitudinally disposed fingers 16 of the same shape as the pockets 12 and adapted to enter the latter for regulating the capacity of said pockets, thereby to permit the discharge of any desired quantity of grain.

Threaded in an opening in the cylindrical gage member 15 is a clamping screw 17, the inner end of which is adapted to bear against the operating shaft 14 for clamping the gage in adjusted position.

Slidably mounted on the forward end of the cylinder 11 are a plurality of stop plates 18 adapted to bear against the front face of the casing 5 and prevent rearward movement of the cylinder 11 within the bore of the casing.

The plates 18 are provided with elongated slots 19 for the reception of clamping screws 20, which latter extend through the slots and engage the cylinder 11 so that by loosening the screws 20 the plates may be retracted or moved in the direction of the operating shaft 14 to permit the withdrawal of the cylinder 11 from within the casing.

Secured to or formed integral with the peripheral edge of the flange 13 are a series of radiating finger pieces or pins 21 which by engagement with the casing form stops to prevent the withdrawal of the cylinder 11 through the front portion of the casing, said pins also serving as finger pieces by means of which the device may be operated manually if desired.

The rear face of the casing 5 is cut away at 22, and riveted or otherwise rigidly secured to the casing at said cut away portion is one end of a flat spring 23, the free end of which is inclined or beveled and extended in the path of movement of the finger pieces 21 so as to retard the rotary movement of the cylinder 11.

The pins 21 are so arranged with respect to the pockets or compartments 12 that one of the pins 21 will bear against the spring 23 as each pocket registers with the discharge spout 8 so as to slightly retard the rotary movement of the cylinder and thus permit the ready discharge of the grain from the pockets into the bags or packages designed to receive the same.

If desired, a wheel or pulley 24 may be secured at one end of the operating shaft 14 and connected through the medium of a belt with an engine or other source of power for operating the device.

In operation, seed, grain or other material is introduced into the hopper 7 and enters the pockets 12 as the latter successively register with the hopper, the material in said pockets being discharged through the spout 8 into a bag or package when the pockets register with the spout.

In order to regulate the capacity of the compartments 12 it is merely necessary to release the adjusting screw 17 and slide the gage 15 longitudinally of the operating shaft 14 and subsequently tighten the screw 17, as will be readily understood.

By loosening the screws 20 and forcing the plates inwardly in the direction of the operating shaft 14 the outer ends of said plates will clear the casing 5 so as to permit the removal of the cylinder 5 and gage 15 through the rear face of said casing.

It will of course be understood that as many pockets may be formed in the cylinder 11 as is found desirable or necessary, an additional pin 21 being placed on the cylinder for each additional compartment or pocket. It will also be understood that the machines may be built in different sizes to accommodate different materials and that the cylinder 11 and casing 5 will be so constructed as to prevent crushing of the seed or grain when the machine is in operation.

Having thus described the invention what is claimed is:

1. A grain meter including a casing having a discharge spout, a cylinder mounted for rotation within the casing and provided with a plurality of receiving pockets adapted to successively register with the discharge spout, means operating within the pockets for varying the capacity of the same, and means for automatically retarding the rotary movement of the cylinder as the compartments successively register with the discharge spout, said retarding means also serving to prevent withdrawal of the cylinder through the front of the casing.

2. A grain meter including a casing having a hopper and provided with a discharge spout, a cylinder mounted for rotation within the casing and provided with a plurality of receiving pockets adapted to successively register with the discharge spout, means slidably mounted within the pockets for varying the capacity of said pockets, pins extending radially from one end of the cylinder, and a spring arranged in the path of movement of the pins and adapted to successively engage the same and retard the rotary movement of the cylinder as the pockets register with the discharge spout said pins also forming stops to prevent withdrawal of the cylinder through the front of the casing.

3. A grain meter including a casing having a hopper and provided with a discharge spout, an operating shaft, a cylinder mounted for rotation with the operating shaft and provided with a plurality of receiving pockets adapted to successively register with the discharge spout, a gage slidably mounted on the operating shaft and provided with fingers operating within pockets for varying the capacity of the latter, means for locking the gage in adjusted position, and means for retarding the rotary movement of the cylinder as the pockets successively register with the discharge spout, said retarding means serving to prevent the withdrawal of the cylinder through the front of the casing.

4. A grain meter including a casing, an operating shaft mounted for rotation within the casing, a cylinder secured to the shaft and provided with a plurality of receiving pockets, locking members secured to one end of the cylinder and bearing against the adjacent face of the casing, a gage slidably mounted on the operating shaft for varying the capacity of the pockets, and means for locking the gage in adjusted position.

5. A grain meter including a casing having a hopper and provided with a discharge spout, a shaft mounted for rotation within the casing, a cylinder secured to the shaft and provided with a plurality of receiving pockets, pins extending radially from one end of the cylinder and arranged near the rear face of the casing, locking plates secured to the front end of the cylinder and adapted to bear against the front face of the casing, a gage slidably mounted on the operating shaft and provided with longitudinal fingers operating within the pockets for varying the capacity of the latter, means for clamping the gage in adjusted position, and a spring secured to the casing and disposed in the path of movement of the pins for retarding the rotary movement of the cylinder.

6. A grain meter including a casing having a hopper and provided with a discharge spout, lugs extending laterally from one side of the casing for engagement with a support, an operating shaft, a cylinder mounted for rotation with the operating shaft and provided with a plurality of receiving pockets, a gage member slidably mounted on the operating shaft and provided with longitudinally disposed fingers adapted to enter the pockets for varying the capacity of said pockets, means for locking the gage in adjusted position, means for retarding the rotary movement of the cylinder as the pockets successively register with the discharge spout, and a clamping device extending through one of the lugs for engagement with a support.

7. A grain meter including a casing having a hopper and provided with a discharge spout, a shaft mounted for rotation within the casing, a cylinder secured to the shaft and provided with a plurality of receiving pockets, radiating pins secured to one end of the cylinder, locking plates secured to the opposite end of the cylinder and having elongated slots formed therein, clamping members extending through the slots for holding the plates in adjusted position, a gage slidably mounted on the operating shaft and provided with fingers adapted to enter the pockets for regulating the size of the latter, and means for clamping the gage in adjusted position.

In testimony that I claim the foregoing as my own, I have hereto affixed my signature in the presence of two witnesses.

WILLIAM ROSS.

Witnesses:
HENRY A. DENKLER,
J. G. THOMPSON.